United States Patent [19]

Young

[11] 4,027,815

[45] June 7, 1977

[54] WIRE GUIDING ASSEMBLY ON A BALER

[75] Inventor: Robert G. Young, Bird-in-Hand, Pa.

[73] Assignee: Sperry Rand Corporation, New Holland, Pa.

[22] Filed: Apr. 5, 1976

[21] Appl. No.: 673,773

[52] U.S. Cl. ............................ 226/194; 242/157 R; 254/190 R

[51] Int. Cl.² ...................................... B65H 17/20

[58] Field of Search .................. 226/190, 194, 196; 242/157 R; 254/190 R, 192, 197; 308/1

[56] References Cited

UNITED STATES PATENTS

| | | | |
|---|---|---|---|
| 2,723,105 | 11/1955 | Franklin | 254/190 R |
| 3,327,964 | 6/1967 | Nussbaumer | 226/190 X |

Primary Examiner—Joseph F. Peters, Jr.
Assistant Examiner—Gene A. Church
Attorney, Agent, or Firm—John R. Flanagan; Frank A. Seemar; Michael R. Swartz

[57] ABSTRACT

An improved assembly on a baler for guiding a tying medium, such as at least one strand of wire, toward the bale tying mechanism on the baler includes at least one roller element mounted for rotation on the baler and having an annular portion defining a wire guiding channel which opens outwardly, a replaceable wear collar or wrapper element removably received about the roller element within its channel and at least one guide element mounted on the baler adjacent the roller element. The wrapper element is engaged by the wire strand during guiding of the same toward the bale tying mechanism. The guide element has a portion which extends alongside the strand guiding channel and has a pair of spaced apart flanges which extend toward and within the channel to define a guiding passageway for the wire strand through the guide element which is generally aligned with the channel of the roller element.

14 Claims, 9 Drawing Figures

WIRE GUIDING ASSEMBLY ON A BALER

BACKGROUND OF THE INVENTION

1. Field of the Invention

The present invention relates generally to the banding of bales formed by a hay baler with a tying medium, such as wire or the like, and, more particularly, is concerned with an improved assembly for guiding the tying medium toward the tying mechanism of the baler.

2. Description of the Prior Art

Heretofore, assemblies of rollers and guides have been provided on a hay baler, being mounted on the bottom of the bale case thereof, for guiding a tying medium, such as usually two or three strands of wire or the like, from a source of supply thereof, such as spools of the wire mounted on the baler adjacent the bale case, toward tying means on the baler, such as usually two or three wire tying or twisting mechanisms.

The prime requisites of satisfactory roller and guide assemblies include the combined ability of the rollers and guides to positively guide or control the path of movement of the wire, low inertia and bearing drag characteristics on the part of the rollers, an adequate roller diameter to minimize wire drag thereon, the relative ease of threading of the wire strands through the guides and superior durability of the parts which promotes prolonged life and postpones repair or replacement.

One recent version of the roller and guide assemblies utilizes a standard ball bearing chain idler-type roller and slotted guide plates, such as illustrated in FIGS. 7 through 9. These components have performed satisfactorily at lower baling speeds. However, with the advent of higher baling speeds in which the wire strands must be pulled from the supply source with greater velocity, the drag and inertia characteristics of the conventional chain idler-type rollers has become more critical as evidenced by reduced component life and typing problems due to increased component wear. The difficulty to be overcome is that the heavy construction of these chain idler-type rollers, which is necessary to maintain an adequate life span for the rollers due to their contact with highly abrasive wire, creates high inertia forces and generally has higher bearing drag. Further, the slotted guide plates tend to guide the wire to one location on the roller thereby creating a concentrated wear pattern which ultimately shortens the useful life of the roller. Also, the slots of the guide plates are defined by sheared edges which commonly contain burrs which contact the wire and increase the inertia forces and drag thereon.

SUMMARY OF THE INVENTION

The wire guiding assembly of the present invention improves the overall baling operation by decreasing the potentiality for inertia, drag and wear problems to become critical and impede the bale bending process at higher baling speeds. Specifically, the improved assembly substantially eliminates the wire guiding means as a potential limiting factor in the capability of balers achieving increased baling speeds.

Accordingly, the present invention is directed to an improved assembly on a baler for guiding a tying medium, such as at least one strand of wire or the like, toward a desired position on the baler for facilitating the banding of bales formed by the baler with the strand of the tying medium. The assembly includes at least one roller element having a pair of spaced apart sidewalls and a body connected thereto and mounted for rotation on the baler. The roller element body has at least an outer portion being disposed between the sidewalls with the latter extending outwardly beyond the outer portion of the body to form annular spaced apart flanges on the outer body portion which together with the same define an annular strand guiding channel.

An improved feature of the assembly of the present invention relates to a replaceable wear collar or wrapper element which is removably received within the roller element channel about the outer body portion and between the flanges of the roller element. The wrapper element will be engaged by the strand during the guiding of the same toward the desired position on the baler. The wrapper element is preferably in the form of a discontinuous band composed of resilient, inherently wear resistant, springable material, such as hardened spring steel or the like, which may be yieldably fixed to expand the diameter thereof for both removing it from and installing it about the roller element. Furthermore, the wrapper element when installed about the roller element clamps the same within its channel so as to rotate therewith during guiding of the strand as the latter moves from its source of supply toward the baler tying mechanism on the baler.

The wrapper element feature of the present invention allows a roller having a lighter weight of construction to be used, such as a standard, flanged, ball bearing belt idler-type roller which has lower inertia and bearing drag characteristics than the chain idler-type roller of the aforementioned recent version of the roller and guide assembly. Also, any replacement due to wear would only be of the less costly wrapper element and not of the belt idler-type roller since the wrapper element, in being slipped over the roller and by its own inherent clamping action maintained in a relatively fixed position about the roller, provides a replaceable wear surface in the guiding channel of roller.

Another improved feature of the assembly of the present invention relates to at least one guide element being mounted on the baler adjacent the roller element and having a portion which extends alongside the strand guiding channel of the roller element. The guide element portion has a pair of spaced apart flanges which extend toward and overlap with the flanges of the roller element and define a guiding passageway for the wire strand through the guide element which is generally aligned with the channel of the roller element.

The flanges of the guide element advantageously provide a larger area opening then the slots provided heretofore that would be easier to thread the wire strand through and will not tend to concentrate the wear pattern at one location on the roller wrapper element. In addition, the spaced apart flanges provide larger guiding surface areas for the wire strand to contact than that provided heretofore by the sheared edges which defined the slots and without the burrs of the latter.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Figure 1:
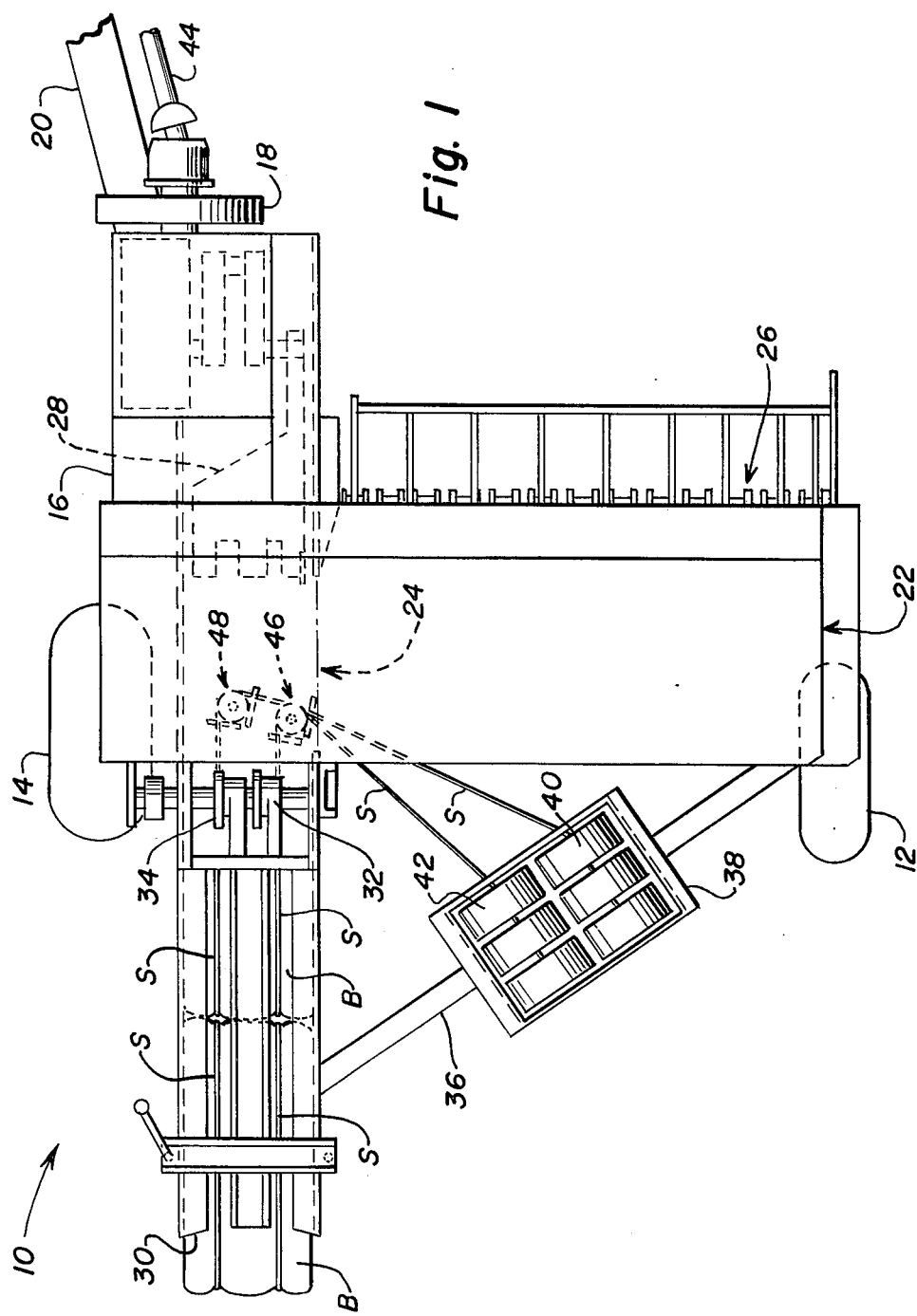
FIG. 1 is a generally diagrammatic top plan view of a hay baler showing the general location thereon of the improved wire guiding assemblies embodying the principles of the present invention.

Referring now to the drawings, and particularly to FIG. 1, there is shown a hay baler, being indicated generally by numeral 10. The baler 10 is supported and made mobile by right and left rotatably mounted ground-engaging wheels 12, 14 and includes a fore-and-aft extending bale case 16 at its left side having a forward end on which a flywheel 18 is rotatably mounted and forwardly from which extends a pivotally mounted tongue 20. When articulately connected at a forward hitch end (not shown) of its tongue 20 to the drawbar of a tractor (not shown), the baler 10 may be towed across a field along a windrow of hay.

The baler 10 further includes a feeder housing 22 transversely mounted adjacent to the right side of the bale case 16 within which is mounted a feeding mechanism (not shown) operable to convey crop material into the bale case 16 through an inlet opening therein, generally designated 24. A pickup assembly 26 mounted forwardly of and below the feeder housing 22 is operable to lift crop material, such as hay or the like, from the field and deliver it to the feeding mechanism.

A plunger 28 is mounted for fore-and-aft reciprocable movement in the bale case 16 for forming the crop material conveyed therein through the bale case inlet opening 24 into rectangular bales B. As the bales B are formed in the bale case 16, they move progressively toward the rear or discharge end 30 of the bale case 16. Means for banding the bales B with a suitable tying medium, such as wire or the like, is operatively mounted on the bale case 16 and includes a pair of wire tying or twisting mechanisms, generally designated 32, 34, being mounted on top of the bale case 16. It will be understood, of course, that instead of two wire tying mechanisms, there could be three or some other number of such mechanisms. When each bale is completely formed, a tripping mechanism (not shown) of the banding means is actuated by a rotating metering wheel (not shown) to initiate the tying or twisting operation whereby strands of wire S are delivered to the respective mechanisms 32, 34 by a pair of needles (not shown) of the banding means which project and carry intermediate portions of the wire strands upwardly through the bale case 16 from the bottom thereof.

The strands of wire S for banding the bales B extend from a source of supply thereof to about the bale B being formed and onto the tying mechanisms 32, 34 of the bale banding means. A support member 36 extends diagonally from the bale case 16 to the back of the feeder housing 22 and carries a container 38 which is adapted to hold six spools of wire in two rows thereof. As a bale B is being formed in the bale case 16, the continuous wire strands S of the forwardmost pair of the spools thereof 40, 42 are unwound and pulled therefrom to band the bale B. Once the wire from these spools have been depleted, the operation of the baler is temporarily stopped until the leading ends of the strands S from the next two spools are spliced with the trailing ends of the strands afrom the depleted spool. Then, the bale forming and banding operation is continued.

As is conventional, when a bale B is being formed in the bale case 16, certain components of the wire tying mechanisms 32, 34 clamp or hold the leading ends of the wire strands S such that the strands become looped around the top, bottom and rear end of the bale B as the same progresses along the bale case 16 toward the discharge end 30 thereof. Then, upon initiation of the tying or twisting operation, the needles engage respective intermediate portions of the wire strands S and deliver the same around the forward end of the bale B to respective positions located adjacent the clamped leading ends of the strands S to thereby complete formation of the loops or bands of the wire strands about the bale B.

Then the wire tying mechanism 32, 34 cut and clamp the delivered wire strand portions and tie or twist the opposite ends of the respective loops together to provide a banded bale B. After each bale B is banded, it emerges from the discharge end 30 of the bale case 16 as another bale B is being formed in the bale case 16.

An input driveline 44, being connected at its rear end to the baler flywheel 18, is adapted for connection at its forward end to the power take-off (pto) shaft of the tractor (not shown) for rotation in unison therewith to supply rotary driving power to the operating components of the baler 10 through additional conventional power transmitting components (not shown).

All of the components of the baler 10 which have been described thus far are conventional and well known in the art. Such components constitute no part of the improvements provided by the present invention other than to establish the environment in which the improved guiding assemblies of the present invention are used. Particularly, it is not essential to an understanding of the structure and function of the improved guiding assemblies of the present invention that the components of the bale banding means, i.e., the wire tying mechanisms, needles, tripping mechanism and metering wheel, be illustrated on the baler and described in further detail. For a complete understanding of such components, reference may be had to U.S. Pat. No. 3,202,087 which illustrates and describes components similar thereto.

IMPROVED WIRE GUIDING ASSEMBLIES

As mentioned above, the wire strands S are progressively pulled from their supply source and encircle a bale B as the bale B is being formed in the bale case 16 of the baler 10. Also, intermdiate portions of the strands of wire S must be delivered by the needles to desired positions in the tying mechanisms 32, 34 adjacent the leading ends of the strands S already clamped within the mechanisms 32, 34 in order to complete the hole banding process.

However, in order to insure that the strands S will be properly routed from their supply source to the bale B such that the needles will consistently deliver the wire strands to the mechanisms 32, 34, some means must be provided for effectively guiding the strands from their sources of supply to the needles as the strands are progressively unwound and pulled from such supply source when a bale B is being formed in the bale case 16. Only then will the needles be capable of performing their assigned functions, that being so accurately deliver the wire strands to the twisting locations on the mechanisms 32, 34.

Figure 2:
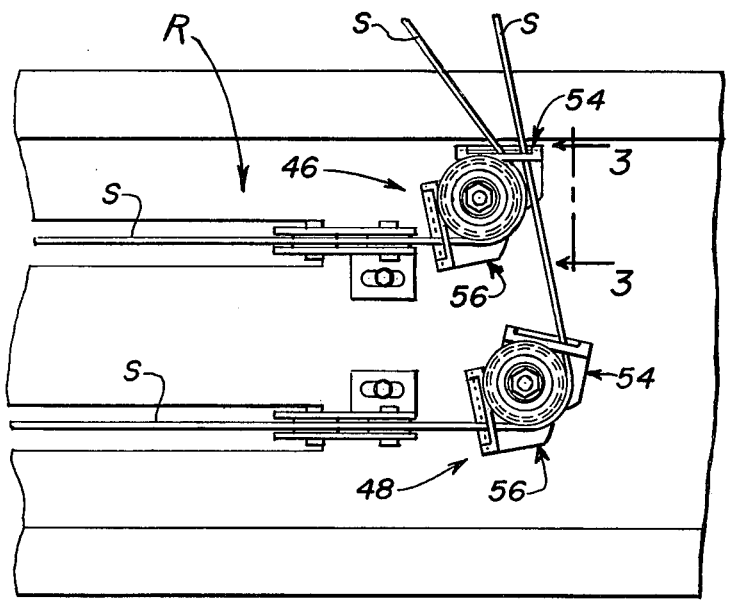
FIG. 2 is an enlarged, fragmentary bottom plan view of the improved wire guiding assemblies of FIG. 1.

As seen in FIGS. 1 and 2, a pair of wire guiding assemblies, generally designated 46, 48 are mounted on the bottom exterior side of the bale case 16 just forwardly of the region, generally designed R in FIG. 2, where the various operating components of the bale banding means are located on the bale case 16. The assemblies 46, 48 provide such means for effectively guiding the wire strands S and do so in an improved manner over the prior art version of such assemblies being shown in FIGS. 7 to 9.

Referring now to FIGS. 3 through 6, the basic components of each of the wire guiding assemblies 46, 48 are a roller element 50, a replaceable wear collar or wrapper element 52 and at least one guide element 54. Preferably, there are two guide elements 54, 56 associated with each roller element 50 as seen in FIG. 2, one element 54 for guiding the wire strand S upon its entry to the roller element 50 and the other element 56 for guiding the wire strand S upon its exit from the roller element 50. The roller and guide elements are assembled together and mounted exteriorly to the bottom of the forward portion of the bale case 16 by a mounting bolt 58 and a spacer 60.

Figure 3:
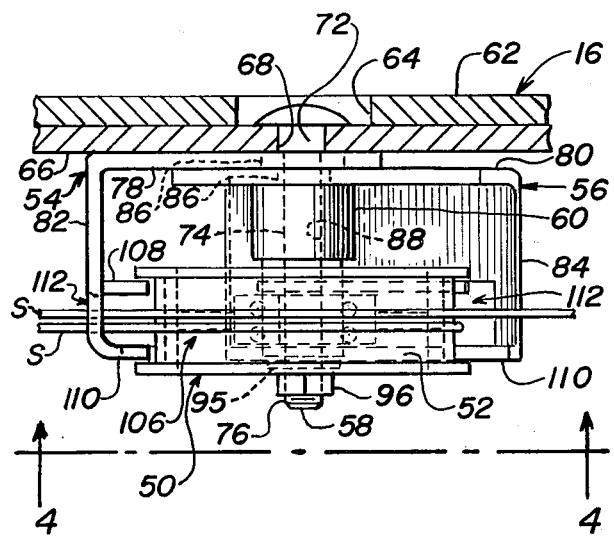
FIG. 3 is an enlarged elevational view of one of the assemblies taken along line 3—3 of FIG. 2.

The bottom of the forward portion of the bale case 16 has a double plate construction, as seen in FIG. 3. The upper bottom plate 62 has a large circular opening therethrough, generally designated 64, while the lower bottom plate 66 has a much smaller rectangular opening therethrough, generally designated 68. The head 70 of the mounting bolt 58 is located within the large opening 64 resting upon the upper side of lower bottom plate 66 with a short rectangular stem portion 72 of the bolt 58 being located immediately below its head 70 extending through the rectangular opening 68 of the lower bottom plate 66. Remainder of the bolt 58 is comprised by an elongated cylindrical stem portion 74 which terminates into a threaded portion 76 at its lower end.

The guide elements 54, 56 are in the form of angle plates and respectively include base portions 78, 80 and side portions 82, 84. The guide elements or plates 54, 56 are substantially identical to one another except that the side portion 82 of plate 54 is slightly shorter than the side portion 84 of plate 56. The latter difference is so that when the base portion 78 of plate 54 is placed or stacked on the base portion 80 of plate 56, the side portions 82, 84 of the plates 54, 56 will effectively have the same height dimension relative to the mounting position of the roller element 50.

Each of the plate base portions 78, 80 have defined therein an oblong slot 86 located adjacent its inner edge. With the guide plates 54, 56 disposed in their stacked relationship, as clearly shown in FIG. 3, their slots 86 are aligned and receive therethrough the cylindrical stem portion 74 of the mounting bolt 58.

The spacer 60 is disposed between the upper side of the roller element 50 and the base portion 78 of guide plate 54 such that a central bore 88 defined through the spacer 60 is aligned both with the slot 86 in guide plate base portion 78 and with a central bore 90 defined through a ball bearing portion 91 of the roller element 50. The cylindrical stem portion 74 of the mounting bolt 58 extends downwardly through the plate base portion slots 86 and on through central bore 88 in the spacer 60 and central bore 90 in the roller element 50. A washer 95 is received on the stem portion 74 of the mounting bolt 58 between the lower side of the roller element 50 and the top of a nut 96 which is applied to the threaded end portion 76 of the mounting bolt 58 and tightened thereon to firmly assemble together and mount the components to the exterior bottom side of the bale case 16.

Figure 5:
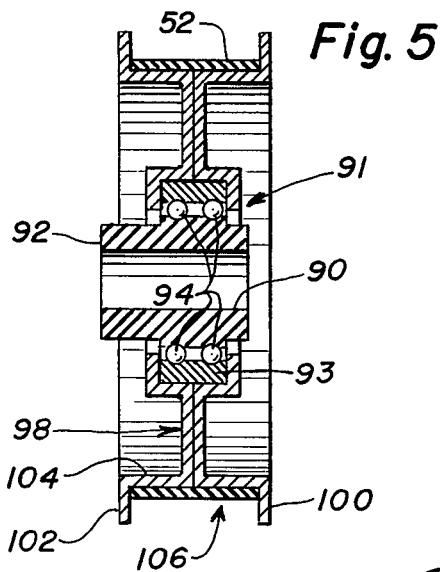
FIG. 5 is an enlarged sectional view taken along line 5—5 of FIG. 4, showing the roller element and the wrapper element clamped thereabout.

The roller element 50 may be a belt idler such as the one commercially available from New Hampshire Industries, Inc., designated by Part No. F-4414 and being illustrated in section in FIG. 5. As mentioned above, the roller element 50 includes a central ball bearing portion 91 which rotatably mounts the roller element 50 with respect to the bolt 58 and thus with respect to the bale case bottom. The bearing portion 91 has an inner part 92 clamped in a stationary position as heretofore described by bolt 58 and about which is rotatably mounted on outer part 93 by ball bearings 94 disposed therebetween. To the outer rotatable part 93 is fixedly mounted an annular body 98 which merges into a pair of spaced apart sidewalls 100, 102. An outer portion 104 of the body 98 is disposed between the sidewalls 100, 102 and the latter extend radially outwardly with respect to the rotational axis of the bearing portion 92 of roller element 50 beyond the outer body portion 104 to form or define generally parallel, spaced apart flanges on the outer body portion 104 which together therewith define a continuous annular strand guiding channel, generally designated 106, which totally encircles the periphery of the roller element 50.

Figure 4:
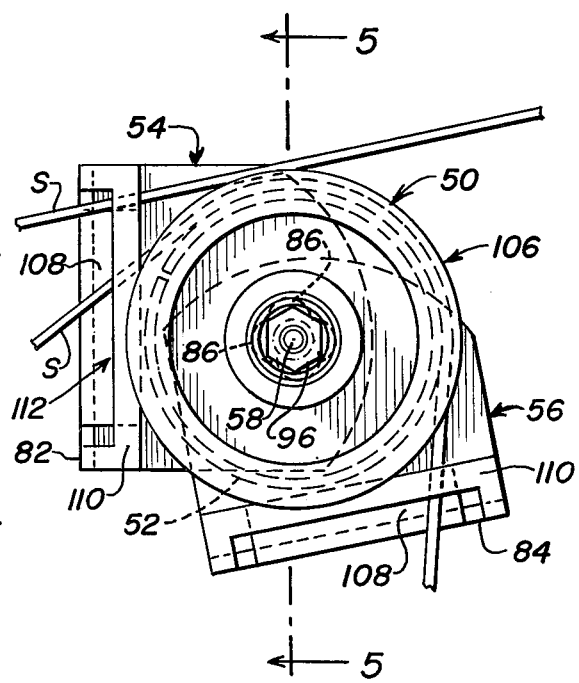
FIG. 4 is a bottom plan view taken along line 4—4 of FIG. 3.

As shown in FIGS. 3 and 4, the wrapper element 52 is received within the channel 106 about the outer portion 104 of the roller element body 98. It preferably takes the form of a discontinuous band or ring, as clearly shown in FIG. 6, composed of resilient, inherently wear resistant, springable material, such as hardened spring steel or the like. The element 52 may be yieldably flexed from its contracted condition of FIG. 6 wherein its opposite ends overlap to an expanded condition wherein the diameter thereof is large enough relative to the overall diameter of the roller element 50 to allow its removal from and installation about the roller element 50. The wrapper element 52, when installed about the outer body portion 104 of the roller element 50 and within the channel 106, retracts to an intermediate expanded condition, as seen in FIG. 4, wherein there exists a very slight clearance between its opposite ends. In being still somewhat expanded, the wrapper element 52 clamps about and against the outer body portion 104 so as to maintain itself in a relatively fixed position about the roller element 50 to thereby rotate therewith during guiding of the strand as the latter moves from its source of supply toward the bale tying mechanism on the baler 10. In such manner any wear due to engagement with the wire strand S will be on the replaceable wear surface now provided by the wrapper element 52 in the guiding channel 106 of the roller element 50.

As mentioned above, the guide plates 54, 56 include base portions 78, 80 and side portions 82, 84 and are substantially identical in construction. Each guide plate is preferably formed by a conventional die punching and bending process from a single blank of metal. However, it should be understood that the guide plate could be fabricated in some other manner such as by welding or otherwise suitably attaching multiple parts together. In the preferred embodiment, the side portion is turned or bent to an approximately 90 degree angle with respect to the base portion. The outer end margin of the side portion of each guide plate is punched and bent during formation of the guide plate so as to form vertically spaced apart, generally parallel upper and lower flanges 108, 110, as seen in FIG. 3. The flanges extend generally toward the inner edge of the base portion of the guide plate and parallel thereto and extend generally perpendicularly from the side portion of the guide plate. A wire guiding passageway 112 is defined through the side portion of the guide plate and between the spaced apart flanges 108, 110 by the latter and also extends slightly into the lower flange 110.

The guide plates 54, 56 are each positioned with their respective side portions 82, 84 sufficiently close to the respective sides of the roller element 50 so as to dispose the outer marginal edges of the flanges 108, 110 within the channel 106 and in overlapping relationship with the adjacent portions of the sidewall flanges 100, 102 on the roller element body outer portion 104. In such manner the wire guiding passageway 112 for the wire strand S through each of the guide plates 54, 56 is generally aligned with the channel 106 of the roller element 50.

Figure 9:
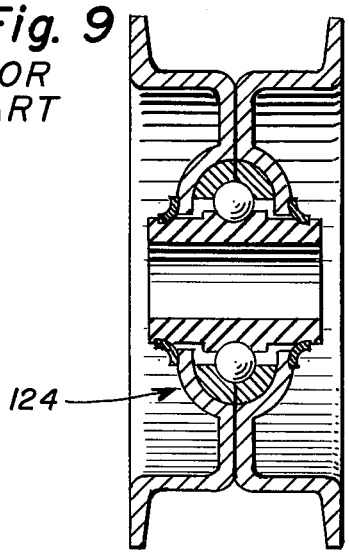
FIG. 9 is an enlarged sectional view taken along 9—9 of FIG. 8, showing only the roller element.
Figure 6:
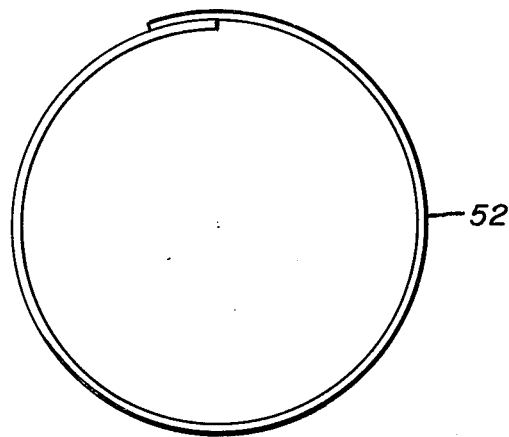
FIG. 6 is an enlarged side elevational view of the wrapper element alone.
Figure 7:
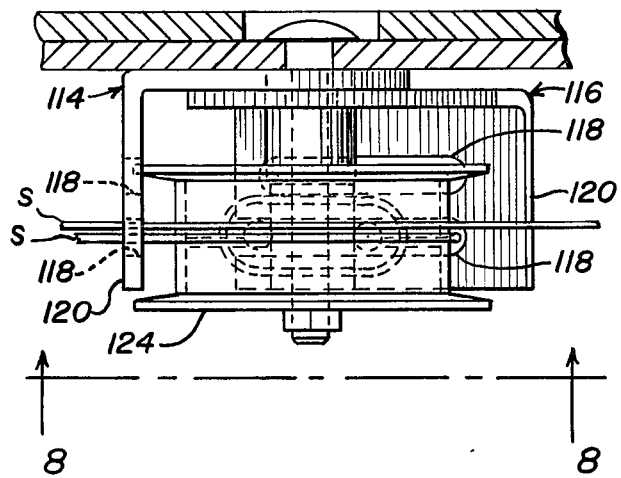
FIG. 7 is a view similar to that of FIG. 3, but showing one of the prior art wire guiding assemblies.
Figure 8:
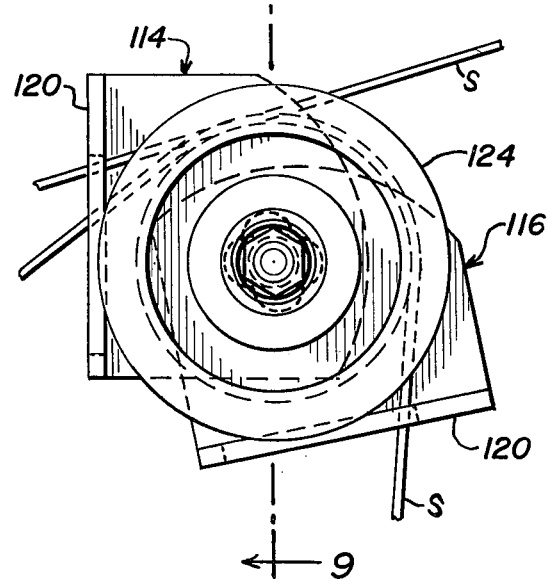
FIG. 8 is a bottom plan view taken along line 8—8 of FIG. 7.

FIGS. 7 through 9 show the prior art version of the guiding assemblies over which the construction of the present invention is an improvement. As illustrated, the prior art guide elements 114, 116 have wire guiding slots 118 defined in the side portions 120, 122 thereof which are narrow in width and oftentimes have burrs thereon due to the punching or shearing of the slot in the metal. The disadvantages of such slots have been pointed out hereinabove and are eliminated by the features of the improved construction of the present invention, namely, the inwardly extending flanges 108, 110 on the side portions 32, 84 which define a wider wire guiding passageway 112. Also, in the prior art version a roller element 124 having a heavy construction was required, due to the wear imposed thereon by the wire strand, in order for the roller element to have an adequate life span. Such roller element 124 was a chain idler such as the one commercially available from Bearings Co. of America, designated by Part No. 6362-A and being illustrated in section in FIG. 9. The wrapper element 52 of the present invention obviates the necessity for using that type of idler for the roller element of the guiding assembly. The wrapper element 52 in being more readily replaceable and less costly than the roller element 50 enhances the serviceability of and minimizes the repair expense now associated with the improved wire guiding assembly. Also, by making it easier to service this critical area of the baler 10, it is to be expected that the operator would be willing to devote more attention periodically to it.

For replacing a worn wrapper element 52 with a new one, the nut 96 is removed from the mounting bolt 58 and the roller element 50 and guide plates 54, 56 are then removed and disassembled. Through use of two screwdrivers, the operator may readily expand the worn wrapper element 58 enough to remove it from the roller element 50. Then, a new wrapper element 52 may be expanded by hand and slipped onto the roller element 50. Finally, the nut 96 is fastened onto the lower end of the bolt 58 after the guide plates 54, 56 and roller element 50 have been reassembled together on mounting bolt 58 with the flanges 108, 110 of each of the plates 54, 56 disposed within the channel 106 and in overlapping relationship with the sidewall flanges 100, 102 on the roller element 50.

It is thought that the improved wire guiding assembly of the present invention and many of its attendant advantages will be understood from the foregoing description and it will be apparent that various changes may be made in the form, construction and arrangement of the parts of the assembly described without departing from the spirit and scope of the invention or sacrificing all of its material advantages, the form hereinbefore described being merely a preferred or exemplary embodiment thereof.

Having thus described the invention, what is claimed is:

1. An improved assembly on a baler for guiding a tying medium, such as at least one strand of wire or the like, toward a desired position on said baler for facilitating the banding of bales formed by said baler with said strand of said medium, said improved guiding assembly comprising:
    at least one roller element including a pair of spaced apart sidewalls and a body connected thereto and mounted for rotation on said baler, said body having at least an outer portion being disposed between said sidewalls, said sidewalls extending outwardly beyond said outer portion of said body to form spaced apart flanges on said outer body portion which together with the same define a strand guiding channel; and
    a wrapper element removably receivable over at least one of said flanges to and from within said channel about said outer body portion and between said flanges, said wrapper element, when received within said channel, being engaged by said strand during the guiding of the same toward said desired position on said baler.

2. The assembly as recited in claim 1, wherein said wrapper element is composed of resilient material which may be yieldably flexed to expand the size of said element for both removing and installing the same over said one flange from and about said outer body portion of said roller element.

3. The assembly as recited in claim 1, wherein said wrapper element is in the form of a discontinuous flexible band which may be flexed to enlarge the size of said element and thereby facilitate both its removal and installation over said on flange from and about said outer body portion of said roller element.

4. The assembly as recited in claim 1, wherein:
said outer body portion is generally cylindrical in shape; and
said wrapper element is composed of inherently springable material which conforms to the shape of said outer body portion of said roller element and clamps about said outer body portion for rotation with said roller element when said wrapper element is installed about said roller element outer body portion.

5. An improved assembly on a baler for guiding a tying medium, such as at least one strand of wire or the like, toward a desired position on said baler for facilitating the banding of bales formed by said baler with said strand of said medium, said improved guiding assembly comprising:
at least one roller element mounted for rotation on said baler, said roller element including an annular portion defining a strand guiding channel which opens outwardly; and
a replaceable wear collar removably receivible over said roller element annular portion to and from about said roller element within said channel defined thereon, said collar, when received within said channel, being engaged by said strand during the guiding of the same toward said desired position on said baler.

6. The assembly as recited in claim 5, wherein said collar is composed of resilient material, such as hardened spring steel or the like, which may be yieldably flexed to expand the diameter of said collar for both removing and installing the same over said annular portion from and about said roller element.

7. The assembly as recited in claim 5, wherein said collar is in the form of a discontinuous flexible band which may be flexed to enlarge the diameter of said collar and thereby facilitate both its removal and installation over said annular portion from and about said roller element.

8. The assembly as recited in claim 5, wherein said collar is composed of inherently wear resistant, resilient, springable material which clamps about said roller element within said channel defined thereon for rotation with said roller element when said collar is installed about said roller element.

9. An improved assembly on a baler for guiding a tying medium, such as at least one strand of wire or the like, toward a desired position on said baler for facilitating the banding of bales formed by said baler with said strand of said medium, said improved guiding assembly comprising:
at least one roller element including a pair of spaced apart sidewalls and a body connected thereto and mounted for rotation on said baler, said body having at least an outer portion being disposed between said sidewalls, said sidewalls extending outwardly beyond said outer portion of said body to form spaced apart flanges on said outer body portion which together with the same define a strand guiding channel; and
at least one guide element mounted on said baler adjacent said roller element and including a portion which extends alongside said strand guiding channel of said roller element so as to face said channel, said guide element portion having a pair of spaced apart flanges which extend toward and overlap with said flanges of said roller element and define a guiding passageway for said strand through said guide element portion facing said channel and between said spaced apart flanges on said guide element portion such that said passageway is generally aligned with said channel of said roller element.

10. The assembly as recited in claim 9, further comprising:
a wrapper element removably received within said channel about said outer body portion and between said flanges on said outer body portion, said wrapper element being engaged by said strand during the guiding of the same toward said desired position onsaid baler.

11. The assembly as recited in claim 10, wherein:
said guide element flanges extend into said channel between said flanges on said outer body portion of said roller element; and
said wrapper element is disposed about said outer body portion and extends between the same and inner ends of said guide element flanges.

12. An improved assembly on a baler for guiding a tying medium, such as at least one strand of wire or the like, toward a desired position on said baler for facilitating the banding of bales formed by said baler with said strand of said medium, said improved guiding assembly comprising:
at least one first guide element mounted for rotation on said baler, said first guide element including an annular portion defining a strand guiding channel which opens outwardly; and
at least one second guide element mounted on said baler adjacent said first guide element and including a portion which generally faces said strand guiding channel of said first guide element, said second guide element portion having a pair of spaced apart flanges which extend within said channel of said first guide element and define a guiding passageway for said strand through said second guide element portion which is generally aligned with said channel of said first guide element.

13. The assembly as recited in claim 12, further comprising:
a third guide element removably received about said annular portion of said first guide element and within said channel defined by said annular portion, said third guide element being engaged by said strand during the guiding of the same toward said desired position on said baler.

14. The assembly as recited in claim 13, wherein a portion of said third guide faces said guiding passageway defined by said flanges of said second guide element.

* * * * *